Jan. 12, 1937. P. SPENCE 2,067,510
PRESSURE REDUCING APPARATUS
Filed May 22, 1931
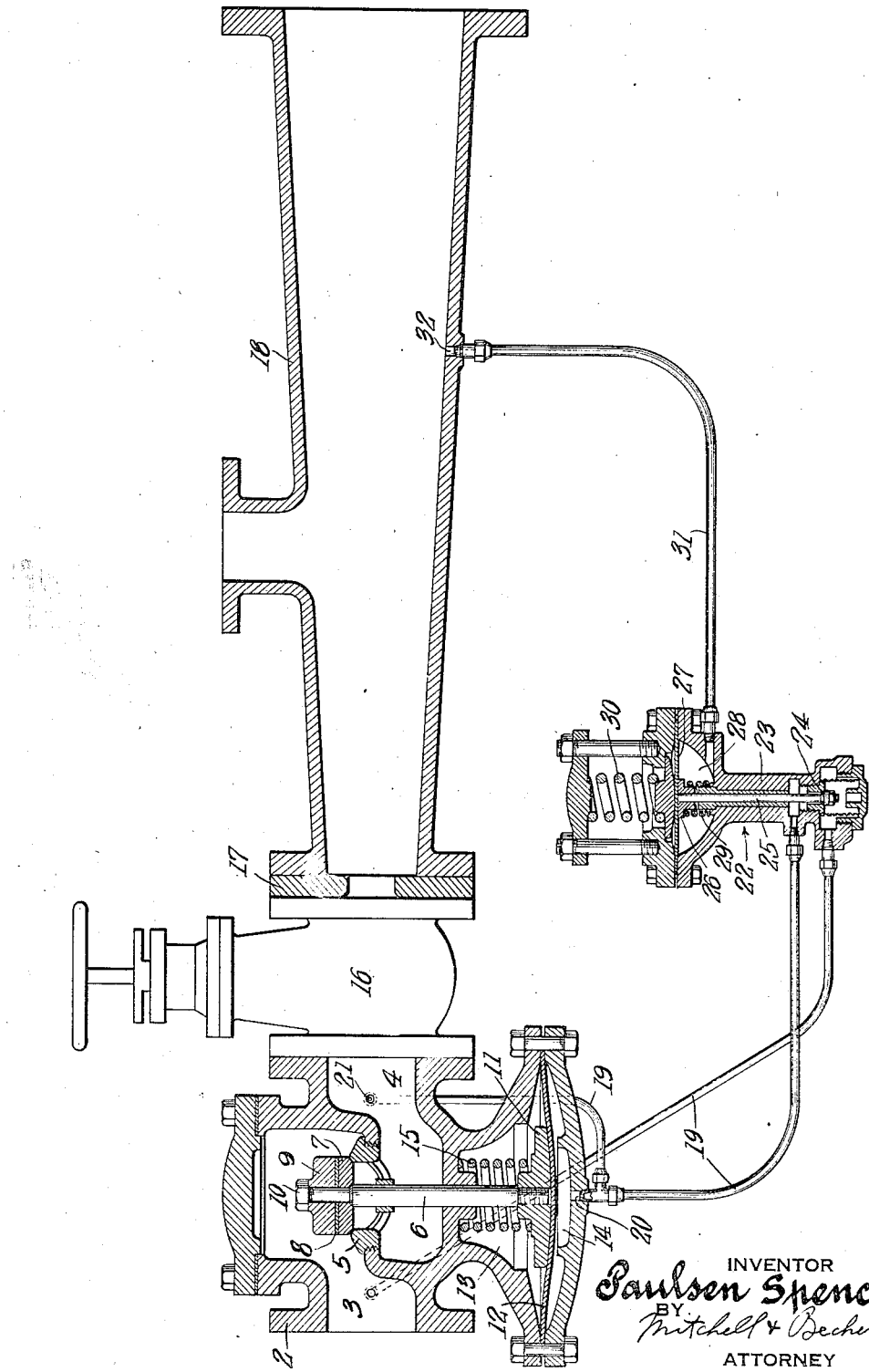
INVENTOR
Paulsen Spence
BY
Mitchell & Bechert
ATTORNEY Patented Jan. 12, 1937

2,067,510

UNITED STATES PATENT OFFICE 2,067,510

PRESSURE REDUCING APPARATUS

Paulsen Spence, East Orange, N. J.

Application May 22, 1931, Serial No. 539,265

1 Claim. (Cl. 251—159)

My invention relates to a pressure reducing apparatus for reducing the pressure of fluids.

As is well known, pressure reducing valves are apt to be noisy. The noise is largely due to the vibration caused by the fluid passing at high velocity through the restricted orifice between the valve head and valve disc, and is especially noticeable when the valve is only partly open. The valve disc, due to its position in the path of the fluid stream and its comparatively small bulk, is especially liable to vibrate noisily. Noise is also caused by the vibration incident to eddy currents in the discharge pipe leading from the valve.

It is an object of the present invention to provide a pressure reducing apparatus for effecting a reduction in the pressure of a fluid without any substantial noise.

Briefly stated, I achieve this result by providing means for muffling the valve disc, and means for creating a resistance in the discharge of the valve so that the valve will open wider, and means for reducing eddy currents in the discharge pipe leading from the valve. Each of these means can be separately employed, but the best results will be obtained by using them in combination.

Other objects and features of the invention will be pointed out or will become apparent upon a reading of the specification.

In the drawing, which shows, for illustrative purposes only, a preferred form of the invention—

The figure is a central sectional view of a pressure reducing apparatus embodying the features of my invention, parts being shown in elevation.

In the drawing, 2 represents the body of a main valve which may be of the type disclosed in my co-pending application Serial No. 366,837, filed May 29, 1929, and now Patent No. 1,995,-949, issued March 26, 1935. The body 2 has an inlet chamber 3 and an outlet chamber 4. 5 represents a valve seat and 6 is a valve stem. Attached to the valve stem 6 is a valve disk 7, muffling means 8, and a valve head 9. The valve disk 7 is formed so as to fit the seat 5, and the seat and disk are curved to create a Venturi effect so that the maximum velocity is at the center of the orifice.

The valve head 9 is quite thick and of heavy construction. Interposed between the disc 7 and the head 9 and held between these members is the muffling means 8. This means preferably consists of a compressible packing washer or gasket which serves to damp the vibration of the disc 7. In the form shown, the valve stem 6 passes through openings in the disc 7, in the muffling means 8, and in the head 9. The parts 7, 8, and 9 are held in place against a shoulder on the valve stem 6 by means of a nut 10 which is threaded onto the end of the valve stem 6.

Coacting with a disc 11 attached to the valve stem 6 is a flexible diaphragm 12. The diaphragm is contained in a diaphragm chamber which may be integral with the body 2. The diaphragm divides the diaphragm chamber into two chambers 13 and 14, which, for convenience, I shall term the upper and lower diaphragm chambers respectively.

A light spring 15 may be placed, preferably in one of the diaphragm chambers, for the purpose of taking up slack. Communication is provided between the outlet chamber 4 and the diaphragm chamber 13 by loosely fitting the valve stem 6 in the body 2 so that the fluid in the outlet chamber 4 will leak past the valve stem 6 into the diaphragm chamber 13. 16 is a hand-operated gate valve which may be secured to the outlet side of the main valve 2.

I provide means for creating a resistance in the discharge of the main valve so that it will open wider than it otherwise would, thus causing a substantial reduction in the wire-drawing effect and reducing vibration and noise. This means is an orifice plate 17, having a restricted opening therethrough, which may be connected to the discharge side of the hand-operable valve 16. By means of this orifice plate a double stage pressure reduction is secured, the first reduction being caused by the resistance of the restricted orifice between the valve seat 5 and the valve disc 7, and the second reduction being caused by the resistance of the orifice plate 17. Since the main valve is only required to effect a part of the total pressure drop, it can open wider than it would if it had to produce the entire pressure drop. The wider opening of the valve permits a less fluid velocity through the valve, and consequently there is less noise. The hand-operated gate valve 16 is interposed between the main valve and the orifice plate 17 so that the fluid can be shut off from the orifice plate 17 whenever it is desired to change the orifice plate.

I also provide means for reducing eddy currents in the discharge pipe leading from the main valve. This is a funnel-shaped nozzle 18 which is connected to the discharge side of the valve. This reduces eddy currents in the discharge, and when the apparatus is used with an elastic fluid, such as steam, it permits the fluid to expand gradually, keeping the velocity practically constant, so that vibration and noise are reduced.

19 is a fluid conducting means leading from the inlet chamber 3 to the diaphragm chamber 14 and also to the outlet chamber 4. The fluid conducting means 19 opens into the diaphragm chamber 14 through the restricted orifice 20 and opens into the outlet chamber 4 through the restricted orifice 21.

Interposed in the fluid conducting means 19 is a pilot valve 22. 23 represents the body of the pilot valve. 24 is a valve head, and 25 is a valve stem connected to the valve head 24. 26 is a disc connected to the valve stem 25 and which coacts with a flexible diaphragm 27. The diaphragm 27 together with the body 23 forms a diaphragm chamber 28. 29 is a light spring which holds the disc 26 in contact with the diaphragm 27. 30 is a comparatively heavy spring which is interposed between the body 23 and the diaphragm 27 for the purpose of moving the diaphragm and the valve stem in the direction to open the pilot valve. 31 is a control pipe leading from the diaphragm chamber 28 to the chamber containing the fluid the pressure of which is to be regulated. In the form shown in the drawing, the control pipe 31 opens into the nozzle 18 at a point 32 in the wall of the nozzle.

The sizes of the restricted orifices 20 and 21 regulate the rate of opening or closing of the main valve. The main valve will open more slowly when the restricted orifice 20 is made smaller or when the restricted orifice 21 is made larger. The main valve will close more slowly when either the orifice 20 or the orifice 21 is made smaller.

The operation of the device is as follows:

Let us assume that it is desired to reduce the pressure of a fluid having a pressure of 1000 lbs. to the square inch in chamber 3 so as to maintain a pressure of 200 lbs. to the square inch at point 32 in the nozzle 18. As stated above, this pressure reduction is made in two stages. For instance, the size of the orifice in the orifice plate 17 may be adjusted so that with the normal rate of flow the pressure of the fluid will be reduced from 1000 lbs. per square inch to 500 lbs. per square inch in passing through the main valve, and so that the pressure of the fluid will be reduced from 500 lbs. per square inch to 200 lbs. per square inch in passing through the orifice plate 17. The spring 30 is adjusted so that its tension will be approximately equal to the pressure on the diaphragm 27 when the fluid pressure in the diaphragm chamber 28 is 200 lbs. per square inch. As long as the pressure in the control pipe 31 is less than 200 lbs. per square inch the pilot valve 22 will remain open, allowing high pressure fluid from the chamber 3 to pass through the pipe 19 and the orifice 20 into the diaphragm chamber 14. The high pressure fluid in the diaphragm chamber 14 will act upon the diaphragm 12 so as to hold the main valve open until the pressure in the control pipe 31 reaches 200 lbs. per square inch, at which time the pilot valve will partially close. Thereafter, due to the escape of fluid from the diaphragm chamber 14 to the outlet chamber 4 through the orifices 20 and 21, the pressure in the diaphragm chamber 14 will be gradually reduced until the pressure in the chamber 13 together with the tension of the spring 15 will operate to partially close the main valve. Thereafter, if the pressure in the control pipe 31 drops below 200 lbs. per square inch, the tension of the spring 30 will move the diaphragm 27 against the pressure in the diaphragm chamber 28 so as to cause the pilot valve 22 to open wider. This will cause the pressure in the diaphragm chamber 14 to build up and act upon the diaphragm 12 to cause the main valve to open wider.

It will thus be seen that I have produced a pressure reducing apparatus whereby a substantially uniform and predetermined pressure may be maintained at the outlet side of the main valve without any substantial noise.

While the invention has been described in considerable detail and a specific form shown in the drawing, it is to be understood that the invention may be otherwise embodied and employed in connection with pressure reducing valves and the like of various types other than herein shown.

I claim:

A noise reducing valve for high pressure fluids comprising, a valve body having a valve seat, a valve means comprising a hard metal valve disc to fit said seat, a heavy metallic head, a damping washer interposed between said valve disc and heavy metallic head, a valve stem for securing said valve disc, damping washer and heavy metallic head rigidly together and projecting to a valve actuating means on the side disc opposite said heavy metallic head, said heavy metallic head and damping washer being free of said valve body and seat and said valve disc and heavy metallic head being held entirely separated from each other by said damping washer.

PAULSEN SPENCE.